United States Patent [19]
Gee

[11] 3,721,968
[45] March 20, 1973

[54] MAGNETIC PICKUP
[75] Inventor: Gordon E. Gee, Deerfield, Ill.
[73] Assignee: Electro Corporation, Sarasota, Fla.
[22] Filed: Feb. 2, 1972
[21] Appl. No.: 222,735

Related U.S. Application Data

[63] Continuation of Ser. No. 875,983, Nov. 12, 1969, abandoned.

[52] U.S. Cl. .................340/195, 340/263, 340/271, 324/173, 324/174, 310/168, 322/58
[51] Int. Cl. ............................................G08b 21/00
[58] Field of Search......340/206, 195, 197, 263, 271; 324/173, 174; 310/168

[56] References Cited

UNITED STATES PATENTS

| | | | |
|---|---|---|---|
| 3,676,765 | 7/1972 | Westcott | 322/58 |
| 3,293,636 | 12/1966 | Dunne | 340/347 |
| 3,346,771 | 10/1967 | Sutton | 317/5 |
| 3,473,120 | 10/1969 | Ruof | 324/174 |
| 3,560,854 | 2/1971 | Moss et al. | 324/174 |

*Primary Examiner*—John W. Caldwell
*Assistant Examiner*—Robert J. Mooney
*Attorney*—Alex A. Hofgren et al.

[57] ABSTRACT

A magnetic pickup having an electronic switch circuit incorporated in the sensing unit to generate a high level digital signal, improving the signal form and the signal-to-noise ratio. The switch has an input transistor with a base bias circuit including a diode having a characteristic comparable with that of the base emitter junction of the input transistor, to stabilize the bias and the sensitivity of the switch. In one form of the invention, the emitter coupling element of the transistorized switching circuit has a constant voltage independent of the supply potential, enabling the use of one circuit over a range of operating voltages.

8 Claims, 6 Drawing Figures

INVENTORS
Gordon E. Gee

BY Hofgren, Wegner, Allen, Stellman & McCord
ATTORNEYS

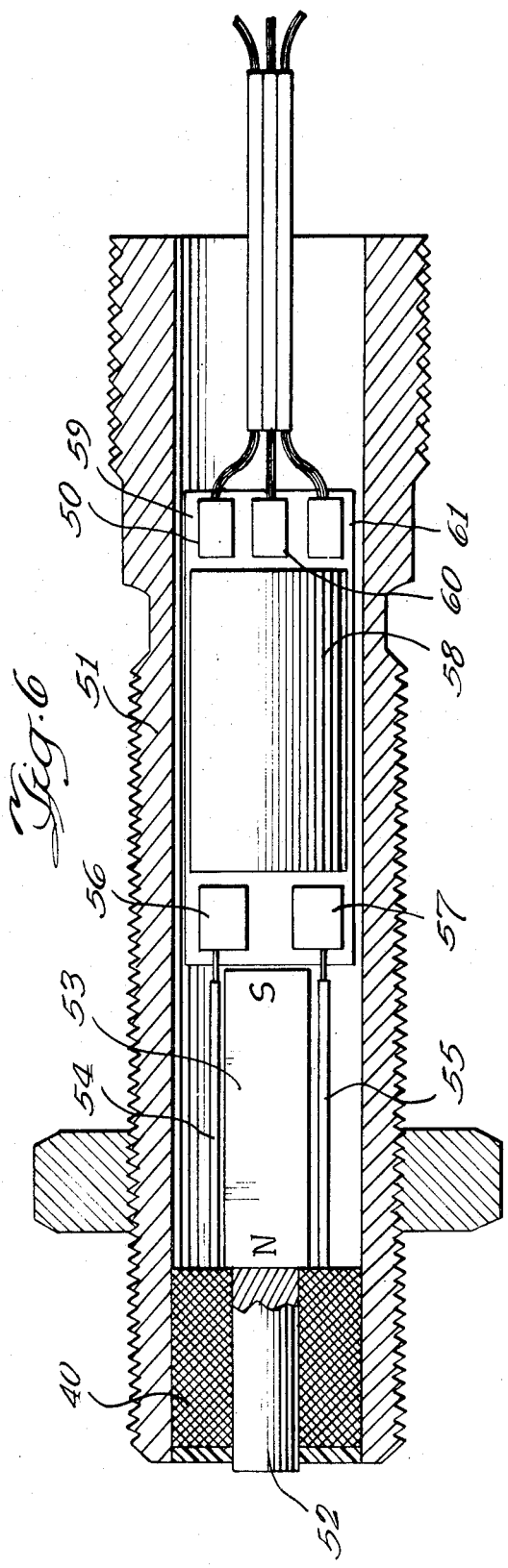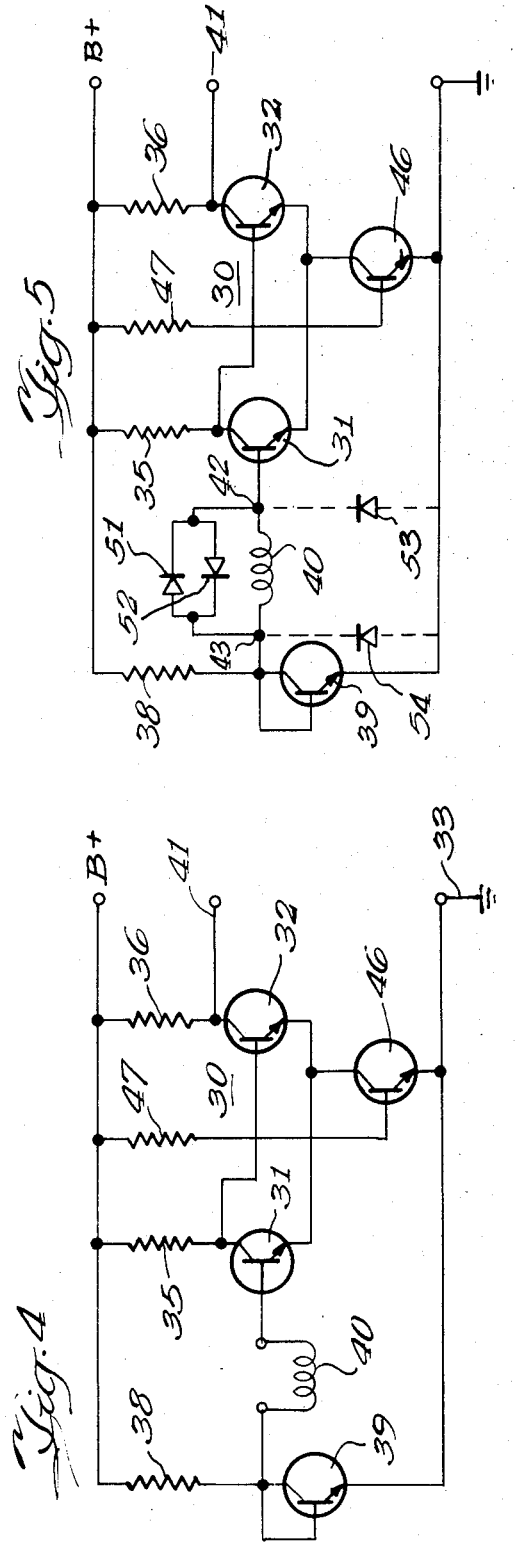

MAGNETIC PICKUP

This application is a continuation of application Ser. No. 875,983, filed Nov. 12, 1969, now abandoned.

This invention relates to a magnetic pickup, i.e., a sensing device responsive to a change in flux linking a coil. In a typical magnetic pickup a coil has a core of magnetic material with an end projecting from the coil to form a pole piece. A permanent magnet at the rear of the coil establishes magnetic flux which links the turns of the coil. A case surrounds the core and coil leaving only the pole piece exposed. Relative movement between the pickup and a body of magnetic material having a discontinuity causes a change in the flux linking the coil, inducing a voltage in the coil.

A common application of a magnetic pickup is in a system for measuring the speed of a rotating shaft. The pickup is located adjacent a gear on a shaft and senses movement of the gear teeth. The voltage induced in the coil is a function of the coil inductance and the rate of change of flux linking the turns of the coil.

Where the actuator is coarse, as slow moving, widely pitched gear teeth, the output is a series of voltage pulses followed by an exponential decay. With a fine actuator, i.e., rapidly moving closely spaced gear teeth, the output voltage approximates a sine wave. Both the form and amplitude of the output are functions of the relative speed of movement between the pickup and the body being sensed.

The circuit to which the pickup is connected is normally located some distance away with a length of cable extending between them. If the pickup is used in noisy environment, it is susceptible to false actuation through signals inductively or capacitively coupled to the pickup coil or to the associated connecting cable.

In accordance with the invention, the signal generated in the pickup coil is coupled with a switching circuit which has a digital output, of uniform shape and amplitude.

More particularly, a feature of the invention is that the switching circuit is located at the pickup, preferably inside the pickup housing. Thus the output of the pickup is established at a high voltage level, above the level of ambient noise.

Another feature is that the switch has an input stage connected with the coil and including a source of bias for the input stage together with means for stabilizing the bias. This prevents variations in sensitivity of the circuit. Specifically, the input stage of the switching circuit is a transistor, and the base bias for the transistor is stabilized by a diode-connected transistor of the same type as the input transistor so that the temperature characteristics of the elements are the same.

A further feature of the invention is that the switching circuit has input and output stages with a common coupling element, which has a constant voltage characteristic. Thus, the circuit may be used over a range of operating voltages and has a digital or on-off output with a range between on and off levels which is a function of the source potential.

Yet another feature is that the coupling element is a transistor with its emitter-collector circuit connected in series with the emitter-collector circuits of the input and output transistors and a bias circuit connected from the potential source to its base, causing the coupling transistor to conduct heavily with the emitter-collector saturation voltage stabilizing the switching circuit.

Further features and advantages of the invention will readily be apparent from the following specification and from the drawings, in which:

FIG. 4 is a circuit of a preferred embodiment of the invention;

FIG. 5 is a circuit of a modified embodiment of the invention; and

FIG. 6 is a longitudinal section of a pickup unit incorporating the invention.

The on-off switching circuit which is incorporated in the magnetic pickup unit in accordance with the present invention produces a digital or on-off output. The on-off switching circuit has a novel input bias network that permits high sensitivity and yet is stable over a wide range of operating conditions. The bias network and the connection of the pickup coil in series between the bias source and the switch input provide a high degree of noise immunity.

The digital output of the pickup may be used directly in auxiliary digital equipment, without the need for additional interface equipment to generate the digital signal.

Figure 1:
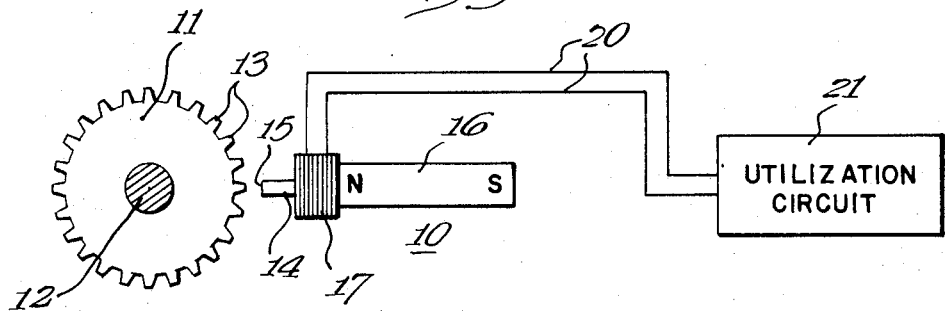
FIG. 1 is a diagrammatic illustration of a magnetic pickup sensing system.

In FIG. 1 a representative pickup unit 10 is illustrated in a system for determining the speed of rotation of gear 11 mounted on shaft 12. The teeth 13 of gear 11 move past the end of core 14 which forms a pole piece 15. A permanent magnet 16 is located rearwardly of core 14 and establishes a magnetic field through it. Coil 17 surrounding core 14 is linked by the flux from magnet 16.

As teeth 13 of the gear move past pole piece 15 the reluctance of the magnetic path to flux from magnet 16 varies and thus the total flux linking coil 17 varies. The resulting voltage induced in coil 17 is connected through conductors 20 with a utilization circuit 21.

Details of the utilization circuit form no part of the invention and will not be illustrated. Many suitable circuits are known.

Figure 2:
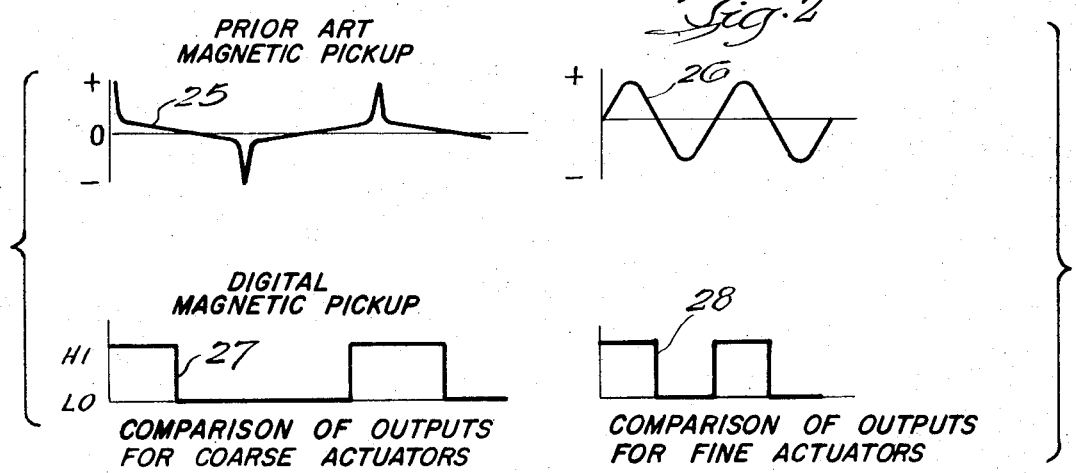
FIG. 2 is a series of waveforms illustrating the invention.

In FIG. 2 the outputs of prior art magnetic pickups are illustrated by curves 25 and 26. With a coarse actuator the output waveform 25 is a series of alternate positive and negative pulses with low levels of positive and negative voltage between successive pulses due to small increases and decreases in flux linking the coil. With a fine actuator, as gear 13, the output waveform 26 approximates a sine wave.

The digital output of the pickup incorporating the invention is illustrated by rectangular waveforms 27 and 28 which will be described in more detail in connection with the description of the circuits.

During the course of the following description, specific type designations and the component values will be given for operative circuits. The purpose of this specific disclosure is to illustrate operative embodiments of the invention. The values and relationships are not critical unless otherwise specified.

Figure 3:
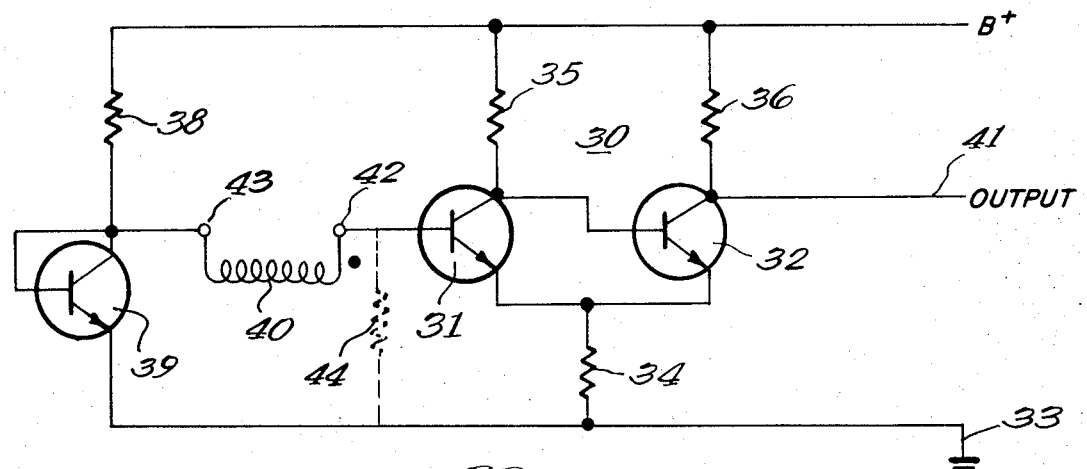
FIG. 3 is a circuit of one embodiment of the invention.

One form of the invention is illustrated in FIG. 3. A transistorized switching circuit 30 has an input stage 31 and an output stage 32, each a type D26C2 transistor. The circuit is powered from a suitable source of positive potential, B+, the negative terminal of which is connected with a reference potential or ground 33. The emitters of transistors 31 and 32 are connected together through a common or coupling impedance element, resistor 34, to ground. The collectors of both transistors are connected through resistors 35, 36, with B+. The base input element of output transistor 32 is connected with the collector of transistor 31.

The input transistor 31 is normally held in a non-conductive condition. A bias is applied to the base through a network including resistor 38, in series with a diode connected transistor 39 across the power supply. The junction between resistor 38 and diode 39 is connected through the pickup coil 40 with the base of input transistor 31. When no signal is induced in coil 40, input transistor 31 is cut off and output transistor 32 conducts. The emitter of input transistor 31 is held positive by the current of transistor 32 flowing through common emitter resistor 34. The base bias developed across diode 39, however, is equivalent only to the base to emitter potential drop of the transistor and accordingly the base is negative with respect to the emitter, and input transistor 31 does not conduct. The output terminal 41 is essentially at ground potential.

When a voltage is induced in pickup coil 40 such that the right hand terminal 42 thereof, connected with the base of transistor 31, is positive with respect to the left hand terminal 43 by an amount sufficient to make the base positive, transistor 31 is caused to conduct. When this occurs, the voltage at the collector drops and output transistor 32 is cut off. The potential at output terminal 41 rises to the value of the power source, B+. So long as the base of the input transistor remains positive with respect to the emitter, the input transistor conducts and the output remains high. However, when the voltage at the base of the input transistor drops to a value near zero, the condition of the circuit rapidly reverses, transistor 31 ceasing conduction and transistor 32 conducting heavily. The voltage at output terminal 41 returns to a low level.

The operation may be compared with that of a prior art pickup by comparing curves 25–27 and 26–28. The voltage curve 25 represents the signal induced in coil 40. When the coil output is high in a positive sense, the output at terminal 41 is high. When the signal induced coil drops to zero, the output falls to zero. No output is obtained from the negative pulse. Similarly, comparing curves 26 and 28, when the coil output (26) is positive, the output from terminal 41 shown by curve 28 is high. When the coil output is negative, output terminal 41 is low.

Diode connected transistor 39 is preferably of the same type as transistor 31 so that the characteristics of the base emitter diodes track with temperature change. The relationship of these characteristics is extremely important in maintaining the level of sensitivity of the pickup.

The output derived from switch circuit at terminal 41 may be utilized as an input for digital utilization circuitry, as a counter or the like. The input voltage requirements of the circuitry to which the signal is connected determine the potential to be utilized in the power supply. The circuit of FIG. 3 when utilizing a 5 volt source has resistors 35, 36 and 38 with a value of 1000 ohms. Resistor 34 is 2.7 ohms. If the source voltage is changed, resistors 35, 36, 38 must be changed. For example, with a 12 volt source, these resistors have a value of 2200 ohms.

The circuit of FIG. 3 may be operated with conditions of very high sensitivity by virtue of the bias network for the input transistor 31 and the connection of the coil 40 in series between the anode of the bias diode (the collector of the transistor 39) and the base of transistor 31, rather than in some other configuration as shunted across the base-emitter circuit of transistor 31, for example. These two features contribute to a noise immunity which enables operation of the switching circuit with a low level of input signal. The switching circuit is subject to actuation from an off to an on condition only with one polarity of signal. Thus, 50 percent of the random noise is ineffective to turn the circuit on. As most utilization circuitry can make use of the turn on indication of the switching circuit (the shift of output terminal 41 from a low to a high condition), the turn off condition is relatively unimportant.

The principal source of noise is from signals inductively coupled to coil 40. As the coil is not returned to ground but floats between the bias diode and the transistor, the spurious signal appears at both terminals and the voltage coupled to the base of transistor 31 is not affected. A second source of interference is from signals induced in the power lead connected with B+. Positive signals at this point are effectively shorted to ground by diode connected transistor 39. As a result of this noise immunity, the sensitivity of the circuit with the components described above, may be of the order of 10 millivolts, as contrasted with a signal of the order of 700 millivolts which might be required to trigger a conventional switching circuit.

The turn off signal level may typically be about one-half of the turn on signal level. Thus, if transistor 31 is caused to conduct with a positive signal of 10 millivolts at its base, it will turn off when that signal falls below 5 millivolts. This hysteresis effect accounts for the nonsymmetrical relation between rectangular wave 27 and the output of the coil with a coarse actuator, illustrated by curve 25.

The stability of the circuit may further by enhanced by the addition of a ground return resistor 44 from the base of transistor 31 to ground 33. In a typical circuit this resistor could have a value of 10,000 ohms.

It is convenient, particularly from a manufacturing standpoint, to have one circuit which may be utilized with a range of source voltages. Such a circuit is illustrated in FIG. 4. Elements common with those in FIG. 3 are given the same reference numerals.

The common emitter impedance element (resistor 34 in FIG. 3) is replaced by a transistor 46 which has its emitter collector circuit connected in series with the switching transistors 31, 32, between the common emitter connection and ground 33. The base of transistor 42 is connected through resistor 47 with B+. The positive potential on the base of transistor 46 keeps it in a saturated condition. In this condition the collector-emitter voltage is essentially constant regardless of the current. Thus, the emitter of input transistor 31 is maintained at the same voltage level with respect to ground over a range of source of voltages. The emitter potential of transistor 31 is a measure of the sensitivity of the switching circuit and, with the common emitter coupling transistor 46, this sensitivity remains essentially the same over a range of source voltages.

In a representative embodiment of the circuit, transistors 31, 32, 39 and 42 are each General Electric type D26C2. Resistors 35, 36, 38 and 47 are 4700 ohms. The circuit is capable of operation with an input or source voltage from 4 to 15 volts.

The circuit will operate from a negative source voltage by substituting PNP transistors for NPN transistors. The relationship of the output signal to the movement of the actuating body relative to pickup coil 40 may be reversed by deriving the output from transistor 31 rather than transistor 32.

Pickup coil 40 is designed to have a positive output, i.e., terminal 42 is more positive than terminal 43 upon the entry of a body of magnetic material into the sensing field. In certain sensing situations the object being sensed is actuated by operation of a DC solenoid. Where the solenoid coil and the magnetic pickup coil are in close proximity, a signal is coupled into the pickup coil upon energization and de-energization of the solenoid. If this induced signal is positive and the orientation of the coils cannot be arranged to eliminate undesired coupling, the polarity of biasing magnet 16 and the winding sense of pickup coil 17 (40) may both be reversed. The relationship of the output of the pickup coil to the movement of the sensed object remains the same while the signal induced in the coil from the interference source is reversed in polarity and tends to turn the first stage of the switch off rather than on.

The amplitude of the voltage induced in pickup coil 40 is a function of several variables. Where the object being sensed is relatively slow moving and widely spaced from the coil, the level of the output voltage may be increased by using a magnet with greater coercive force or increasing the number of turns on the pickup coil. However, when such a pickup is used with a fast moving closely spaced object, the voltage induced in the pickup coil may be quite large and, in some cases, of sufficient amplitude to damage transistors 31 and 39. FIG. 5 illustrates a circuit in which the output of the pickup coil is limited to reduce the danger to the transistors from excessive voltage in the pickup coil. Circuit elements which have been described in connection with FIGS. 3 and 4 are assigned the same reference numerals and will not be described again. In the preferred form of the circuit reversely connected diodes 50 and 51 are in parallel with the pickup coil 40 and limit the voltage which may appear across its terminals to the forward conduction potential of the diodes. When terminal 42 is positive with respect to terminal 43, diode 52 conducts while diode 51 conducts with the opposite polarity condition.

An alternate to the diodes 51, 52 which eliminates the danger to transistors 31 and 39 as a result of an excessive back bias of the base emitter junctions, is provided by diodes 53, 54 connected as shown in broken lines from the terminals of pickup coil 40 to ground. When either of the terminals become sufficiently negative with respect to ground, conduction of the diodes clamps the voltage level and prevents the establishment of damaging potentials on the transistors.

A preferred physical embodiment of the invention is illustrated in FIG. 6. The trigger circuit and bias network are an integrated circuit on a substrate 50 located within shell 51. The pickup coil 40 is located at the forward end of shell 51 and core 52 projects outwardly therefrom. Permanent magnet 53 is located immediately to the rear of core 52. Leads 54, 55 connect coil 40 with terminals 56, 57 on substrate 50. The integrated circuitry is in the center of the substrate and is covered by an insulating coating 58. Three terminal areas 59, 60 and 61 at the rear of substrate 50 provide for connection through a three wire cable 62 with the operating potential source and from the output of the switching circuit to a utilization circuit.

I claim:

1. A magnetic pickup sensing system having a digital signal output, comprising:
   a coil subject to a change in magnetic flux linkage due to relative movement between the coil and a body of magnetic material, which movement induces a voltage across the coil;
   a source of operating potential;
   regenerative electronic switch means having input and output stages, each with a control element and an output circuit, the control element of the output stage being connected with the output circuit of the input stage, the output circuits of both stages being connected across said source of operating potential, and feedback circuit means connected between the stages, each stage having stable, complementary conductive and nonconductive conditions;
   a bias circuit means connected with said source of operating potential and having a point therein with a potential which, when applied as a bias to the control element of the input stage, establishes a stable condition of said switch means;
   an input circuit connecting said coil in series between said point in the bias circuit means and the control element of the input stage of said switch means, the bias potential being applied to said control element through said coil, an induced voltage of one polarity across said coil causing both stages of said switch means to change from one conduction condition to the other; and
   means connected with an output circuit of the switch means for deriving therefrom a digital signal which is a function of the voltage induced across said coil.

2. The sensing system of claim 1 in which the input stage of the switch means is a transistor with a base control element, said bias circuit means for the switch means including a resistor and diode connected in series across said source forming a voltage divider, said coil being connected from the junction between the resistor and diode in the bias circuit means to the base of said transistor, applying the bias potential developed across the diode to the base of the transistor rendering the transistor nonconductive in the absence of a voltage induced across said coil, the base circuit of said transistor drawing current through said resistor when the transistor conducts in response to a voltage induced across said coil, reducing the voltage across said diode and introducing hysteresis which stabilizes operation of the switch means with a low amplitude induced voltage across said coil.

3. The sensing system of claim 1 in which the input stage of the switch means is a transistor having a base control element, and including a pair of reversely connected diodes in parallel across said coil limiting the amplitude of the voltage applied to the base of said transistor.

4. The sensing system of claim 1 in which the input stage of the switch means is a transistor having a base control element, and said system includes means establishing a reference potential and a pair of diodes, one connected from each end of said coil to said reference potential means to limit the reverse bias applied to said transistor.

5. The sensing system of claim 1 in which the input stage of the switch means is a transistor having a base control element, and said system includes means establishing a reference potential and a resistor connected from the base of said transistor to said reference voltage means to enhance the stability of the switch means.

6. The sensing system of claim 1 in which the bias circuit means includes a voltage divider and the bias potential is developed at an intermediate point thereof.

7. The sensing system of claim 1 in which said feedback circuit means includes a common resistor connected in the output circuits of both stages of said switch means.

8. The sensing system of claim 7 in which both stages of said switch means are transistors and said common resistor is connected with the emitters of each transistor.

* * * * *